US006792039B1

(12) United States Patent
Fisher et al.

(10) Patent No.: US 6,792,039 B1
(45) Date of Patent: Sep. 14, 2004

(54) METHOD FOR CONTROLLED REDUCING OF PROCESSOR UTILIZATION BY A SOFT MODEM AND A SOFT MODEM WITH CONTROLLED DIFFERENT PROCESSOR UTILIZATION MODES

(75) Inventors: Abraham Fisher, Haifa (IL); Amnon Gavish, Har Halutz (IL)

(73) Assignee: Surf Communication Solutions Ltd., Yokneam (IL)

( * ) Notice: Subject to any disclaimer, the term of this patent is extended or adjusted under 35 U.S.C. 154(b) by 0 days.

(21) Appl. No.: 08/969,981

(22) Filed: Nov. 13, 1997

(51) Int. Cl.[7] .................................................. H04L 5/16
(52) U.S. Cl. ....................... 375/222; 375/219; 375/220; 709/100; 709/107
(58) Field of Search ............................... 375/222, 341, 375/377, 219, 220; 713/323; 709/100, 101, 102, 103, 104, 107, 108, 236, 248

(56) References Cited

U.S. PATENT DOCUMENTS

| | | | | |
|---|---|---|---|---|
| 4,965,641 A | * | 10/1990 | Blackwell et al. | 375/7 |
| 5,721,830 A | * | 2/1998 | Yeh et al. | 395/200.67 |
| 5,790,781 A | * | 8/1998 | Cox et al. | 395/184.01 |
| 5,794,058 A | * | 8/1998 | Resnick | 395/750.05 |
| 5,799,064 A | * | 8/1998 | Sridhar et al. | 379/98 |
| 5,909,384 A | * | 6/1999 | Tal et al. | 364/724.19 |
| 5,920,599 A | * | 7/1999 | Igarashi | 375/341 |
| 5,925,114 A | * | 7/1999 | Hoang | 710/48 |
| 5,931,950 A | * | 8/1999 | Hsu | 713/300 |
| 5,940,459 A | * | 8/1999 | Hsu et al. | 375/377 |
| 5,960,035 A | * | 9/1999 | Sridhar et al. | 375/219 |
| 5,982,814 A | * | 11/1999 | Yeh et al. | 375/222 |
| 5,995,540 A | * | 11/1999 | Draganic | 375/222 |
| 6,457,037 B1 | * | 9/2002 | Maytal | 709/100 |

OTHER PUBLICATIONS

ITU–T Recommendation V.42 (10/96) "Error–Correcting Procedures for DCEs using Asynchronous–to–Synchronous Conversion".*
Eyuboglu, Vedat, M., et al., *Advanced Modulation Techniques for V. Fast, Invited Paper*, vol. 4, No. 3, May–Jun. 1993, pp. 243–256.
Forney, David G. Jr., et al., *The V.34 High–Speed Modem Standard, IEEE Communications Magazine*, Dec. 1996, pp. 28–33.
ITU–T Recommendation V.34 (09/94) of the International Telecommunication Union, *A Modem Operating At Data Signalling Rates Of Up To 28 800 bit/s For Use On The General Switched Telephone Network And On Leased Point-to–Point 2–Wire Telephone–Type Circuits*.

* cited by examiner

*Primary Examiner*—Shuwang Liu
(74) *Attorney, Agent, or Firm*—Fenster & Company

(57) ABSTRACT

A soft modem having a plurality of selectable operational modes. Each of the operational modes has a different nominal processor utilization level. The soft modem uses a method for changing its nominal processor utilization level while maintaining the logical connection between the local and remote data communication equipment. The method includes operating the soft modem in one of the plurality of operational modes and switching between any one of the plurality operational modes and any other operational mode of the plurality operational modes upon detecting a control signal selected from a group of predetermined control signals for changing the nominal processor utilization level of the soft modem.

31 Claims, 12 Drawing Sheets

METHOD FOR CONTROLLED REDUCING OF PROCESSOR UTILIZATION BY A SOFT MODEM AND A SOFT MODEM WITH CONTROLLED DIFFERENT PROCESSOR UTILIZATION MODES

FIELD OF THE INVENTION

The present invention relates generally to the field of modems and more particularly relates to high-speed telephony soft modems.

BACKGROUND OF THE INVENTION

Soft modems including host signal processing and native signal processing modems (HSP/NSP modems) are based on performing the modem task on a host processor that is performing other tasks at the same time. Prior art soft modems have a fixed nominal value of central processing unit (CPU) utilization which is required for maintaining the logical connection between local and remote data communication equipment (DCE). This nominal value may typically reach approximately 50% of the machine cycles of a 100MHz Pentium processor.

A problem encountered in the implementation of a modem task on a host processor in multitasking operating system environments is that situations often arise in which other tasks co-existing with the modem task have non-stationary CPU utilization characteristics. Such co-existing tasks may incidentally require a high number of CPU cycles before returning control to the operating system. When the number of CPU cycles required by the modem task and other concurrently running tasks exceeds the total number of available CPU cycles, the performance of the other tasks may degrade since normally the operating system gives priority to the modem task over other tasks. For example, when a modem task is run in a multitasking operating system together with a computer game task the game task may suffer performance degradation due to CPU utilization limitations imposed by the operating system due to the prioritized allocation of CPU cycles to the modem task.

SUMMARY OF THE INVENTION

It is therefore an object of the present invention to provide a method for reducing the CPU utilization of a soft modem task without breaking the data flow connection of the modem task.

Another object of the present invention is to provide a soft modem having multiple operational modes, each of the operational modes having a different level of CPU utilization, wherein the switching between the different operational modes is controlled by the host operating system, by an application task concurrent with the soft modem task, by a control task or by a user through a user command interface.

There is therefore provided, in accordance with a preferred embodiment of the present invention, a method for changing the nominal processor utilization level of a soft modem while maintaining the logical connection between the local and remote data communication equipment. The soft modem has at least two selectable operational modes, each of the operational modes has different nominal processor utilization levels. The method includes the steps of operating the soft modem in one of the at least two operational modes and switching between any of the at least two operational modes and any other operational mode of the at least two operational modes upon detecting a control signal selected from a group of predetermined control signals for changing the nominal processor utilization level of the soft modem.

There is also provided, in accordance with a preferred embodiment of the present invention, a soft modem having at least two selectable operational modes. Each of the operational modes has different nominal processor utilization levels. The soft modem uses a method for changing its nominal processor utilization level while maintaining the logical connection between the local and remote data communication equipment. The method includes the steps of operating the soft modem in one of the at least two operational modes and switching between any of the at least two operational modes and any other operational mode of the at least two operational modes upon detecting a control signal selected from a group of predetermined control signals for changing the nominal processor utilization level of the soft modem.

Further, in accordance with another preferred embodiment of the present invention, The soft modem includes a data pump, the data pump includes a receiver and the receiver includes a plurality of receiver modules. The at least two operational modes include a first operational mode in which all of the plurality of receiver modules are active and the soft modem uses bit rates and symbol rates optimized for the prevailing line quality and for the capabilities of a modem to which the soft modem is connected.

The at least two operational modes also include at least one operational mode selected from a second operational mode in which a channel filter module, a timing recovery module, an echo canceller module and a tone detectors module of the plurality of receiver modules are active, while the remaining receiver modules of the plurality of receiver modules are deactivated after storing the equalizer coefficients and the parameters of at least one other adaptive element of the receiver, a third operational mode in which the tone detectors module of the plurality of receiver modules is active, while all the remaining receiver modules of the plurality of receiver modules are deactivated, and a fourth operational mode in which the data pump of the soft modem operates using the lowest bit rate and symbol rate supported by the soft modem when no bit rate limitation is imposed by a current application, or using the lowest bit rate supported by the soft modem which still maintains a bit rate limitation imposed by the current application and the lowest symbol rate supported by the soft modem.

The step of switching is performed by directly switching between one of the at least two operational modes and another operational mode of the at least two operational modes or by switching from one of the at least two operational modes, different than the first operational mode, to the first operational mode followed by switching from the first operational mode to another operational mode of the at least two operational modes.

Further, in accordance with another preferred embodiment of the present invention, the step of switching from the first operational mode to the second operational mode includes the steps of storing the equalizer coefficients of the soft modem and at least one of the adaptive element parameters of the soft modem, deactivating all of the plurality of receiver modules except for the channel filter module, the timing recovery module, the echo canceller module and the tone detectors module, setting the protocol layer of the soft modem to an idle mode for preventing the detection of an inappropriate reception state due to the step of deactivating and the reporting of the inappropriate reception state to layers overlying the protocol layer, and upon detecting a retrain control signal or a rate renegotiation control signal, respectively, performing a retrain or a rate renegotiation procedure and repeating the steps of storing, deactivating and setting.

Further, in accordance with yet another preferred embodiment of the present invention, the step of setting the protocol layer comprises feeding idle bits to the protocol layer.

Furthermore, in accordance with another preferred embodiment of the present invention, the protocol layer is a V.42 protocol layer and the step of setting the protocol layer includes emptying the buffers which interface between the V.42 protocol layer and the layers overlying the V.42 protocol layer.

Furthermore, in accordance with another preferred embodiment of the present invention, the step of switching from the second operational mode to the first operational mode includes the steps of retrieving the equalizer coefficients and the at least one of the adaptive element parameters of the soft modem and reactivating the receiver modules which were deactivated by the step of deactivating.

Furthermore, in accordance with another preferred embodiment of the present invention, the step of switching from the first operational mode to the third operational mode includes the steps of deactivating all of the plurality of receiver modules of the soft modem except for the tone detectors module, setting the protocol layer of the soft modem to an idle mode to prevent the detection of an inappropriate reception state due to the step of deactivating and the reporting of the inappropriate reception state to layers overlying the protocol layer, and upon detecting a retrain control signal or a rate renegotiation control signal performing a retrain or a rate renegotiation procedure, respectively, and repeating the steps of deactivating and setting.

Furthermore, in accordance with another preferred embodiment of the present invention, the step of setting the protocol layer includes feeding idle bits to the protocol layer.

Furthermore, in accordance with another preferred embodiment of the present invention, the protocol layer is a V.42 protocol layer and wherein the step of setting the protocol layer includes emptying the buffers which interface between the V.42 protocol layer and the layers overlying the V.42 protocol layer.

Furthermore, in accordance with another preferred embodiment of the present invention, the step of switching from the third operational mode to the first operational mode includes the steps of reactivating the receiver modules which were deactivated by the step of deactivating, and initiating a retrain or a rate renegotiation procedure.

Furthermore, in accordance with another preferred embodiment of the present invention, the step of switching from the first operational mode to the fourth operational mode includes the steps of checking whether data indicating a minimal bit rate limitation was received from a current task. If the data was received, initiating a rate renegotiation or a retrain procedure to connect the soft modem at a minimal bit rate and at the lowest available symbol rate which maintain the limitations of the current task. If the data was not received, initiating a rate renegotiation or a retrain procedure to connect the soft modem at the lowest bit rate and the lowest symbol rate supported by the soft modem, and upon detecting a retrain control signal or a rate renegotiation control signal performing a retrain or a rate renegotiation procedure, respectively.

Furthermore, in accordance with another preferred embodiment of the present invention, the receiver includes a decision module and the method further includes the step of using hard decision instead of soft decision in the decision module.

Furthermore, in accordance with another preferred embodiment of the present invention, the data pump includes a channel equalizer module, a channel filter module and an echo canceller module, and the method further includes the step of shortening the fixed and adaptive finite impulse response filter length of at least one of the channel equalizer module, the channel filter module and the echo canceller module.

Furthermore, in accordance with another preferred embodiment of the present invention, the method further includes the step of updating the parameters of at least one adaptive element of the soft modem at the lowest possible rate.

Furthermore, in accordance with another preferred embodiment of the present invention, the data pump includes a modulator module and a demodulator module and the method further includes the step of terminating the use of preceding by the modulator module and the demodulator module.

Furthermore, in accordance with another preferred embodiment of the present invention, the data pump includes a modulator module and a demodulator module and the method further includes the step of terminating the use of non-linear encoding by the modulator module and the demodulator module.

Furthermore, in accordance with another preferred embodiment of the present invention, the at least one adaptive element is selected from the group of equalizer coefficients, the phase locked loop coefficients, the timing recovery locked loop coefficients and any combination thereof.

Furthermore in accordance with another preferred embodiment of the present invention, the step of switching from the fourth operational mode to the first operational mode includes the steps of initiating a retrain or a rate renegotiation procedure, and reconfiguring all modules of the soft modem for operating in the first operational mode.

Furthermore, in accordance with another preferred embodiment of the present invention, the control signals are provided by the operating system running the soft modem as a task.

Furthermore, in accordance with another preferred embodiment of the present invention, the control signals are provided by at least one application, the application concurrently running as a task together with the soft modem in a multi-tasking operating system.

Furthermore, in accordance with another preferred embodiment of the present invention, the control signals are provided by a control task concurrently running together with the soft modem in a multi-tasking operating system.

Finally, in accordance with another preferred embodiment of the present invention, the control signals are provided by a user of an operating system running the soft modem as a task.

BRIEF DESCRIPTION OF THE DRAWINGS

The invention is herein described, by way of example only, with reference to the accompanying drawings, wherein.

DETAILED DESCRIPTION OF THE INVENTION

Figure 1:
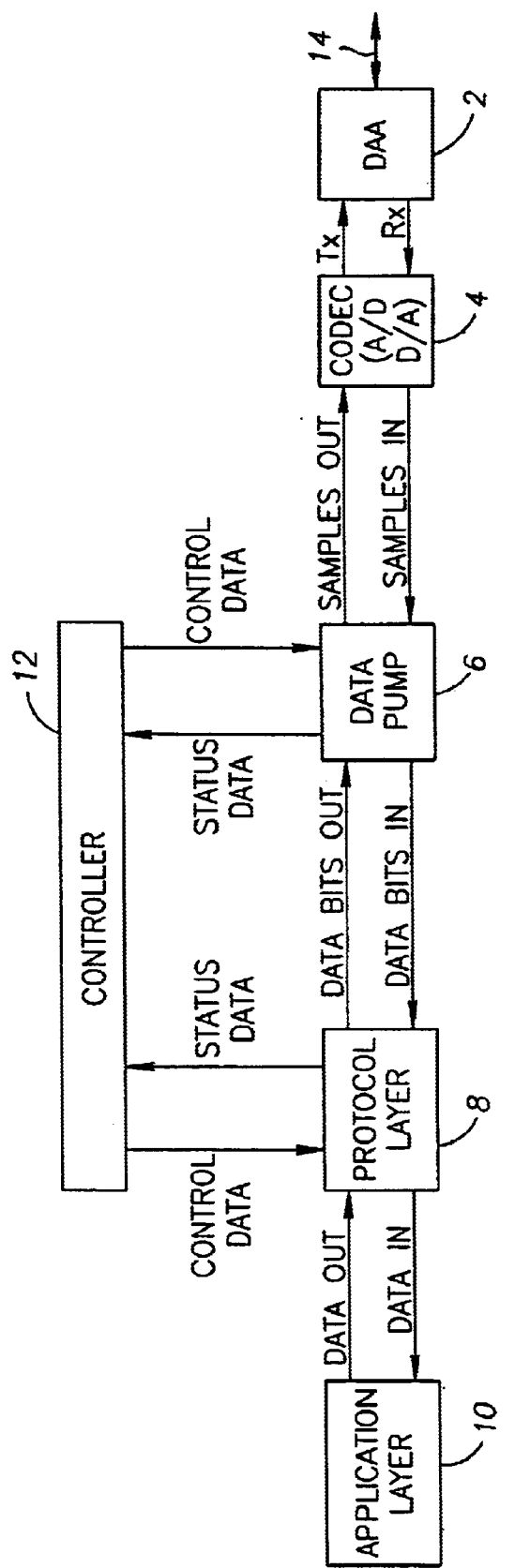
FIG. 1 is a schematic high level block diagram illustrating a typical prior art telephony soft modem environment.

Reference is now made to FIG. 1 which is a schematic high level block diagram illustrating an exemplary prior art high-speed telephony soft modem environment. The soft modem environment includes a data access arrangement (DAA) 2 and a codec 4. The DAA 2 may be any suitable DAA such as the MH 88422 data access arrangment, commercially available from Mitel Corporation, Ontario, Canada. The DAA 2 is connected to a two-way communication line 14 which is connected to the general switched telephony network (GSTN). The codec 4 is connected to a data pump 6 for feeding the digitized sampled signals from the codec 4 to the data pump 6 and for feeding digitizal sampled signals from the data pump 6 to the codec 4 for conversion to an analog signal.

The data pump 6 is connected to a protocol layer 8 for bidirectionally communicating data bits between the protocol layer 8 and the data pump 6. The protocol layer 8 may include flow control, data compression and error correction modules (not shown), but other protocol layers may include other different module combinations. The data pump 6 and the protocol layer 8 are connected to a controller 12 for sending status data to the controller 12 and for receiving control data from the controller 12.

The protocol layer 8 is connected to an application layer 10 for receiving data from the application layer 10 and for sending data thereto. It is noted that, the data exchange between the application layer 10 and the protocol layer 8 can be done synchronously or asynchronously.

Figure 2A:
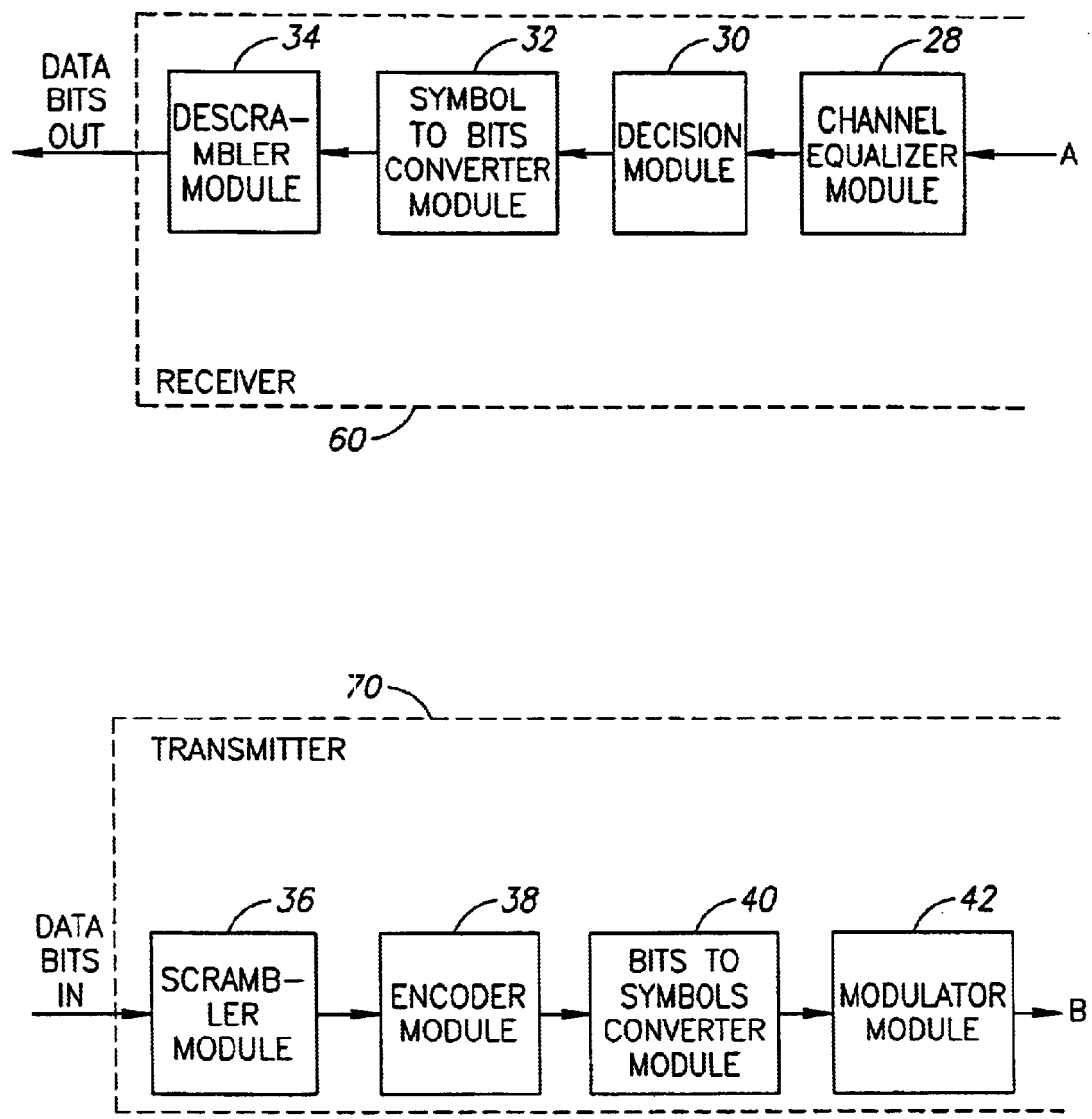
FIG. 2 is a schematic functional block diagram illustrating the data pump of FIG. 1 in detail.
Figure 2B:
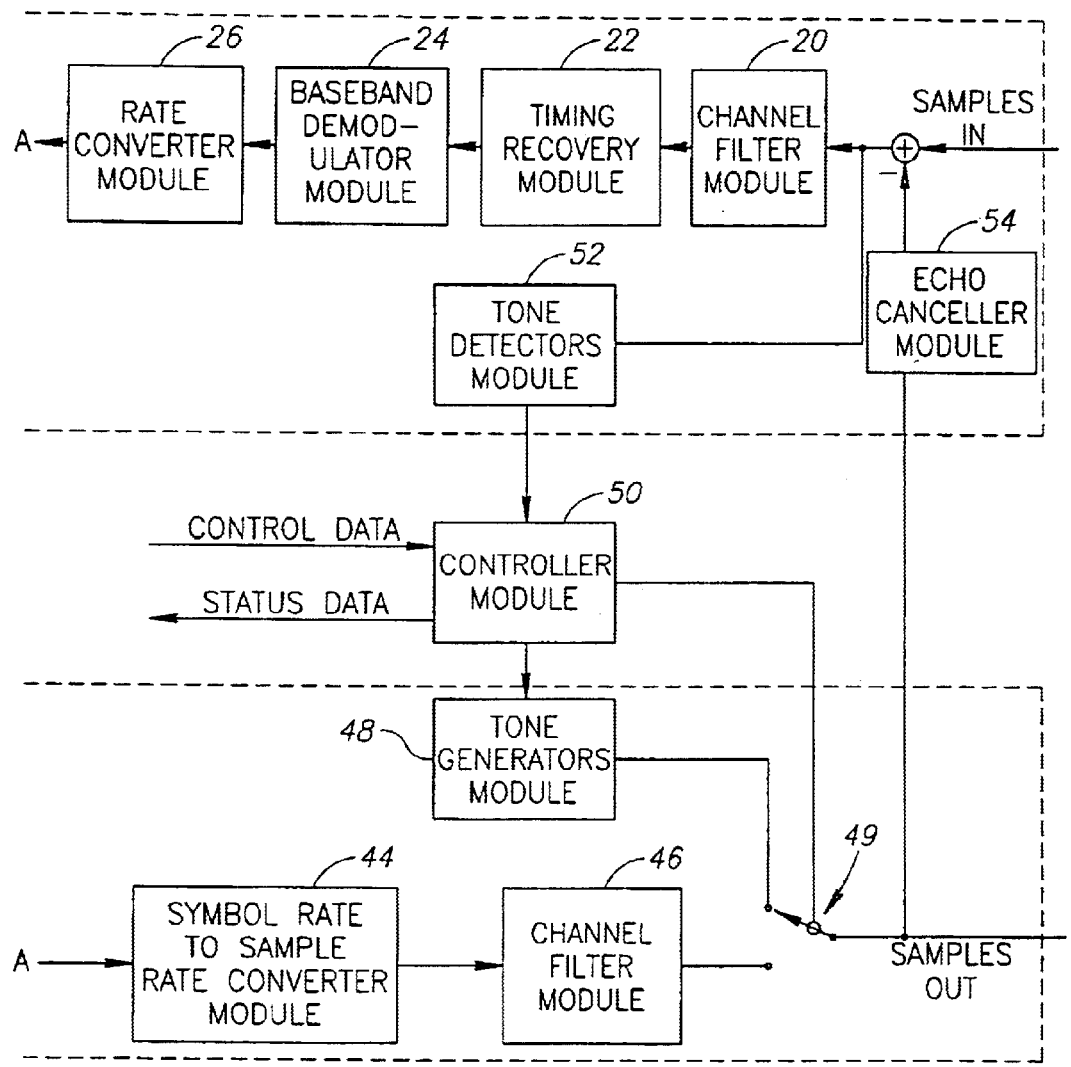

Reference is now made to FIG. 2 which is a schematic functional block diagram illustrating the data pump 6 of FIG. 1 in detail. The data pump 6 includes a receiver 60 and a transmitter 70. The receiver 60 and the transmitter 70 are connected to a controller 50. The controller 50 is connected to the controller 12 of FIG. 1. The data pump 6 also includes an echo canceller 54 connected to the sample input line of the receiver 60 and to the sample output line of the transmitter 70 for performing echo cancellation.

The receiver 60 includes a channel filter 20 for filtering the input samples. The channel filter 20 feeds the filtered samples to a timing recovery module 22 for synchronizing the sampling of the soft modem according to the shift between the clocks of the local and remote modems. The timing recovery module 22 is connected to a baseband demodulator 24 which converts the modulated signal to a base-band signal. The baseband demodulator 24 is connected to a rate converter 26 which converts the signal sampled at a certain rate to a signal sampled at a rate which is a desired multiple of the symbol rate. The rate converter 26 is connected to a channel equalizer 28 which compensates for the line frequency response. The channel equalizer 28 is connected to a decision module 30 which performs hard or soft decision depending on the communication standard and on the specific implementation. The decision module 30 is connected to a symbol to bit converter 32 which converts received symbols or groups of symbols to a stream of incoming bits. The conversion method is determined by the specific communication standard and is not part of the present invention. The symbol to bit converter 32 is connected to a descrambler 34 which descrambles the data bits output from the symbols to bits converter 32 and outputs the descrambled data bits to the protocol layer 8 of FIG. 1.

The receiver 60 also includes a tone detectors module 52 for detecting remote retrain or rate-renegotiation control signals such as a retrain or rate renegotiation tone or tones. The tone detectors module 52 is connected to the controller 50 and sends information about detected tones thereto.

The transmitter 70 includes a scrambler 36. The scrambler 36 receives data bits from the protocol layer 8 of FIG. 1, scrambles them and feeds the scrambled data bits to an encoder 38. The encoder 38 encodes the scrambled data bits and feeds the encoded data to a bits to symbols converter 40 which converts the encoded bits to symbols. The bits to symbols converter 40 then feeds the symbols to a modulator 42 which modulates the signal. The modulated signal is fed to a symbol rate to sample rate converter 44 which resamples the modulated signal to the desired sample rate and feeds the resampled modulated signals to a channel filter 46 for filtering and conversion to real representation if needed.

The transmitter 70 also includes a tone generators module 48. The tone generators module 48 can receive control signals from the controller 50 instructing it to generate a specific tone or tones. The tones generated by the tone generators module 48 can be fed to the samples output of the transmitter 70 by suitable switching of a switch 49. The switch 49 is appropriately switched by control signals generated by controller 50.

It is noted that, the switch 49 is a virtual switch and that in real implementations the tone generation may be differently implemented within the transmitter 70.

The inventors of the present invention have noted and made use of two features of telephony modems using the V.34, V.32bis and V.PCM standards.

The first feature is that telephony modems using these standards have two mechanisms for re-establishing the physical connection, a fast mechanism for renegotiation of data rate and some modulation parameters and a slow mechanism for retraining the modem.

The second feature is that the flow control layer of telephony modems using these standards can maintain normal operation as long as it receives data or idle bits from the physical layer.

These features were utilized in the low-CPU utilization soft modem of the present invention.

It is noted that some of the modules of the data pump implementation of FIG. 2 may be adaptive modules that adapt to the available communication line quality. Different modem standards may implement different adaptive modules. For example, the V.34 high-speed modem standard implements an adaptive bandwidth quadrature amplitude modulation (QAM) modulator with adaptive bandwidth and carrier frequency, an adaptive symbol rate to sample rate module with an adaptive bit rate, an adaptive trellis coded modulation (TCM) modulator and an adaptive precoding equalizer, an adaptive timing recovery and an adaptive echo canceller.

It is also noted that, descrambler module 34 and the scrambler module 36 of FIG. 2 are optional modules and that, in accordance with another preferred embodiment of the present invention, the data pump 6 of the soft modem may be implemented without the scrambler and descrambler modules. Similarly, the modulation and demodulation around a carrier frequency used in V.34, V.32 and V.32bis standards is optional and is not used V.PCM standard modem implementations which use a baseband signal.

A non-limiting example of the soft modem data pump of FIG. 2 is a V.34+ITU standard implementation in accordance with the ITU-T Recommendation V.34September 1994 of the International Telecommunication Union entitled "A MODEM OPERATING AT DATA SIGNALLING RATES OF UP TO 28800 BIT/S FOR USE ON THE GENERAL SWITCHED TELEPHONE NETWORK AND ON LEASED POINT-TO-POINT 2-WIRE TELEPHONE-TYPE CIRCUITS". Incorporated herein by reference.

In another non-limiting example, the soft modem can be implemented in accordance with the upcoming V.PCM standard. In this embodiment no modulation is used. Thus, the modulator module 42 of FIG. 2 and base-band demodulator 24 are not implemented. Other block implementation may vary according to the selected algorithms.

It is noted that, while the embodiments of the soft modem disclosed and illustrated in the various Figures throughout the Application are adapted to the V.34 standard, other embodiments of the soft modem of the present invention can be implemented with suitable modifications, using other modem standards such as the V.32, the V.32bis and the upcoming V.PCM standards.

Figure 3:
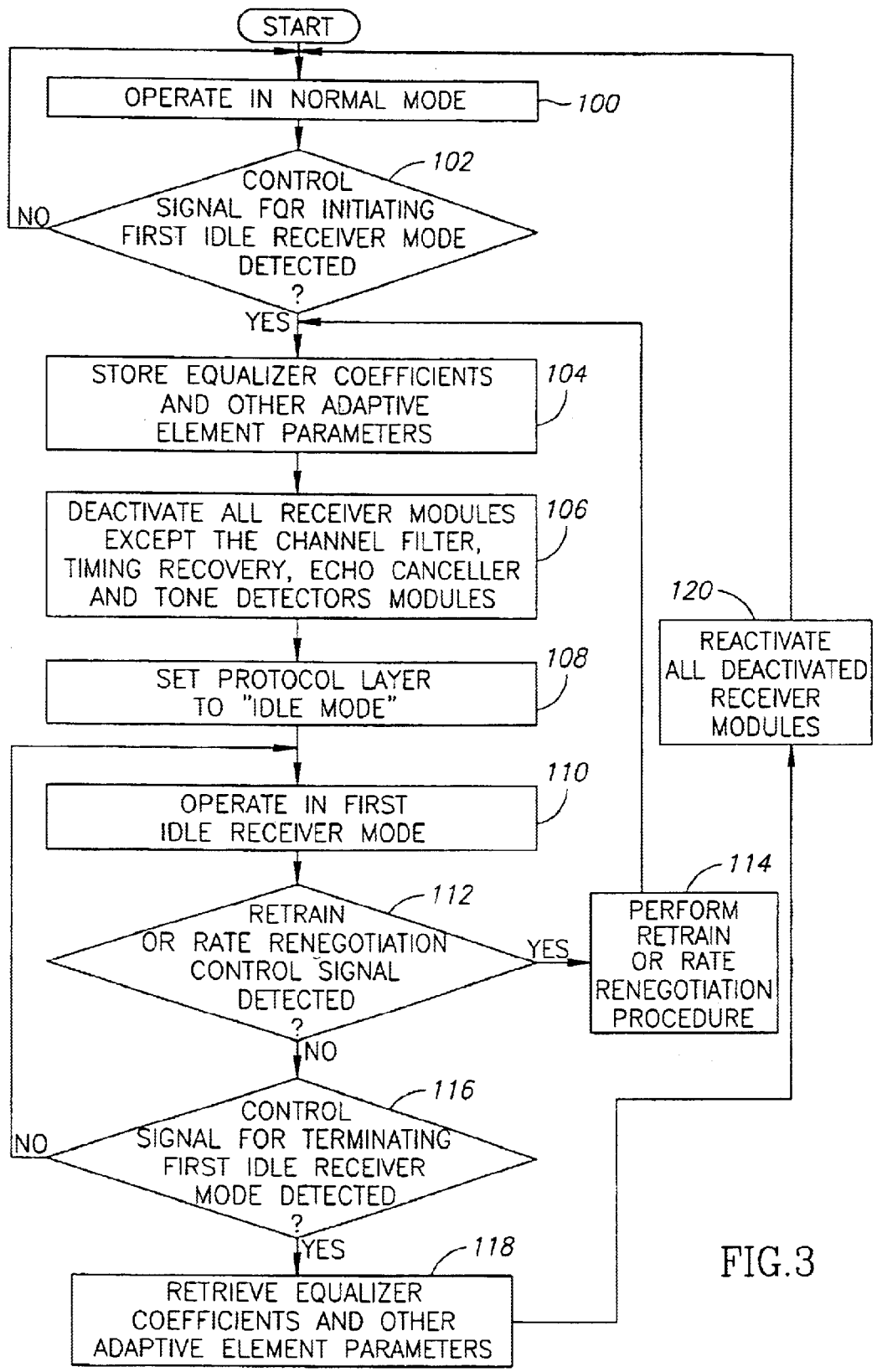
FIG. 3 is a schematic flow diagram illustrating the steps of a first method for implementing a soft modem with a mode of reduced CPU utilization in accordance with one preferred embodiment of the present invention.

Reference is now made to FIG. 3 which is a schematic flow diagram illustrating the steps of a method for implementing a soft modem with a mode of reduced CPU utilization in accordance with a preferred embodiment of the present invention. The mode of reduced CPU utilization illustrated in FIG. 3 is referred to as the "first idle receiver mode" hereinafter.

The soft modem starts by operating in a mode having nominally high CPU utilization (step 100) which is referred to as the "normal mode" hereinafter. The soft modem checks if a control signal for initiating the first idle receiver mode is detected (step 102). If the soft modem receives a control signal for initiating the first idle receiver mode, the soft modem stores the equalizer coefficients and other adaptive element parameters (step 104).

For example, in accordance with a preferred embodiment of the present invention, a soft modem using the V.34 high-speed modem standard may store the equalizer coefficients, the phase locked loop coefficients and the timing recovery locked loop coefficients.

The soft modem deactivates all the receiver modules except for the channel filter module 20, the timing recovery module 22, the echo canceller module 54 and the tone detectors module 52 (step 106).

The soft modem then sets the protocol layer to an "idle mode" (step 108). The protocol Layer idle mode is defined as a state in which the protocol layer is prevented from detecting an inappropriate reception state due to the deactivation of the receiver modules of step 106, and from reporting an inappropriate reception state to layers overlying the protocol layer, such as the point to point (PPP) layer or other layers which are above the PPP layer. For example, in accordance with a preferred embodiment of the present invention, the protocol Layer can be set to idle mode by the soft modem feeding idle bits to the protocol. In another preferred embodiment of the present invention, the protocol Layer can be set to idle mode by modifying the interface between the protocol layer and the layer or layers overlying the protocol layer. For example, in a soft modem having a V.42 protocol layer, the buffers which interface between the v.42 layer and the layer or layers overlying it are set to be empty, thus, preventing the overlying layer from detecting improper receiver functioning.

After the soft modem sets the protocol layer to the idle mode, the soft modem operates in the first idle receiver mode (step 110). In the first idle receiver mode, the transmitter 70 of the data pump 6 is fully functional, while the receiver 60 is only partially functioning due to the inactivated modules, leading to a substantial reduction in CPU utilization of the soft modem.

While operating in the first idle receiver mode, the soft modem checks if a retrain or rate renegotiation control signal is received (step 112). If a retrain control signal or a rate renegotiation control signal is detected, the soft modem performs a retrain procedure or rate renegotiation procedure, respectively (step 114), and transfers control to step 104. If a retrain or a rate renegotiation control signal is not detected, the soft modem checks if a control signal for terminating the first idle receiver mode is detected (step 116). If a control signal for terminating the first idle receiver mode is not detected, the soft modem continues to operate in first idle receiver mode of step 110. If a control signal for terminating the first idle receiver mode is detected, the soft modem retrieves the stored equalizer coefficients and other adaptive element parameters (step 118), reactivates all the deactivated receiver modules (step 120) and returns control to step 100 for operating the soft modem in the normal mode.

Figure 4:
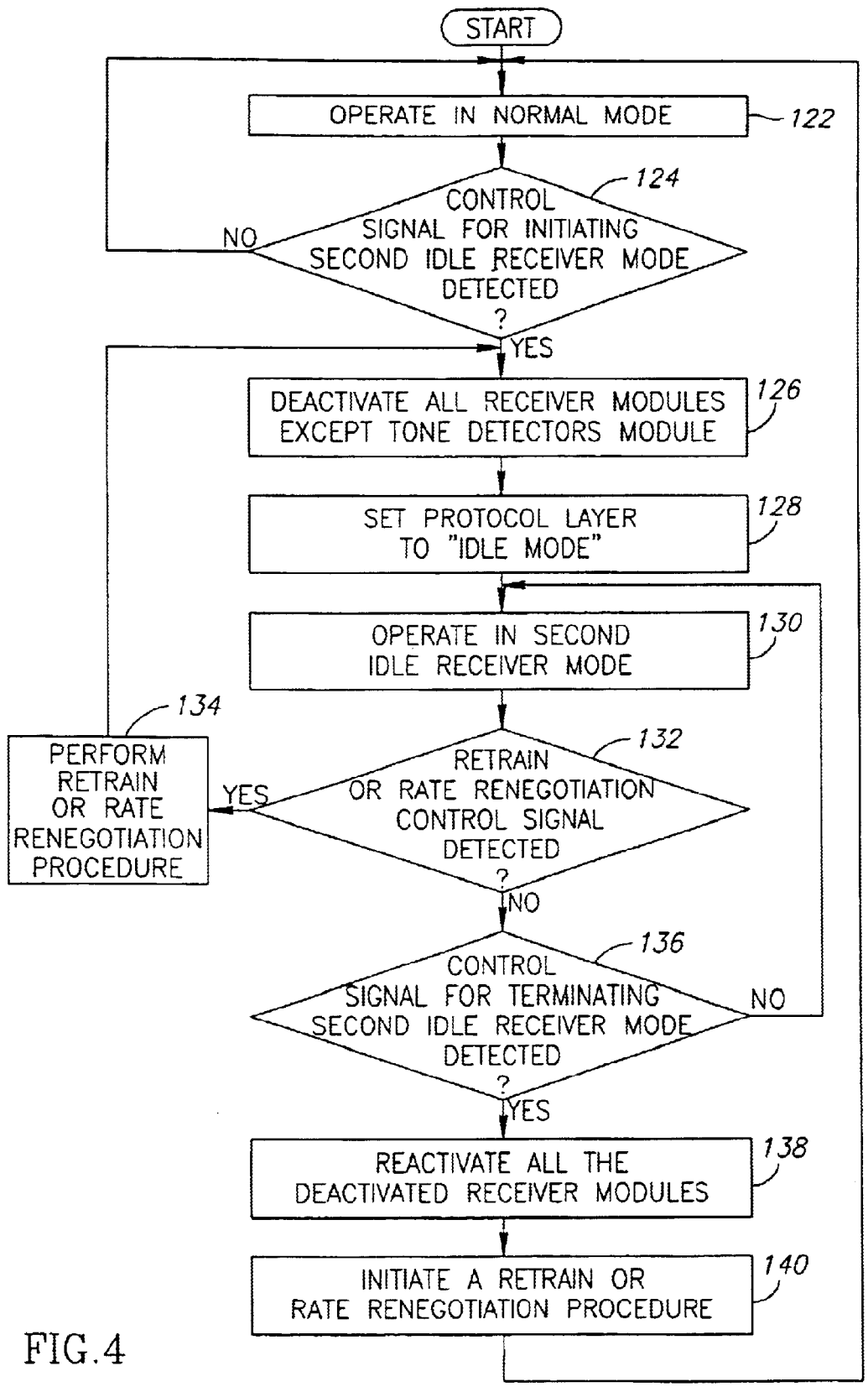
FIG. 4 is a schematic flow diagram illustrating the steps of a second method for implementing a soft modem with a mode of reduced CPU utilization in accordance with another preferred embodiment of the present invention.

Reference is now made to FIG. 4 which is a schematic flow diagram illustrating the steps of a method for implementing a soft modem with a mode of reduced CPU utilization in accordance with a preferred embodiment of the present invention. The mode of reduced CPU utilization illustrated in FIG. 4 is referred to as the "second idle receiver mode" hereinafter.

The soft modem starts by operating in the normal mode hereinabove (step 122). The soft modem checks if a control signal for initiating the second idle receiver mode is detected (step 124). If the soft modem receives a control signal for initiating the second idle receiver mode, the soft modem deactivates all the receiver modules except for the tone detectors module 52 (step 126).

The soft modem then sets the protocol layer to the idle mode (step 128) as disclosed in detail for the first idle receiver mode hereinabove.

After the soft modem sets the protocol layer to the idle mode, the soft modem operates in the second idle receiver mode (step 130). In the second idle receiver mode, the transmitter 70 of the data pump 6 is fully functional, while the receiver 60 is generally deactivated except for the tone detectors module 52. This leads to a reduction in CPU utilization of the soft modem which is greater than the reduction of CPU utilization possible in the first idle receiver mode disclosed hereinabove.

It is noted that, while the second idle receiver mode of FIG. 4 may have a nominally greater reduction of CPU utilization than the reduction nominally possible in the first idle receiver mode of FIG. 3, the "recovery" time required for returning to the normal mode from the second idle receiver mode of FIG. 4 is greater than the recovery time required for returning to the normal mode from the first idle receiver mode of FIG. 3. This slower recovery from the second idle receiver mode results from the fact that a retrain or rate renegotiation procedure is performed which require additional time.

While operating in the second idle receiver mode, the soft modem checks if a retrain or rate renegotiation control signal is received (step 132). If a retrain control signal or a rate renegotiation control signal is detected, the soft modem performs a retrain procedure or rate renegotiation procedure, respectively (step 134), and transfers control to step 126. If a retrain or a rate renegotiation control signal is not detected, the soft modem checks if a control signal for terminating the second idle receiver mode is detected (step 136). If a control signal for terminating the second idle receiver mode is not detected, the soft modem returns control to step 130. If a control signal for terminating the second idle receiver mode is detected, the soft modem reactivates all the deactivated receiver modules (step 138), initiates a retrain or a rate renegotiation procedure (step 140) and returns control to step 122 for operating the soft modem in the normal mode.

It is noted that, while only two exemplary methods for setting the protocol layer to an idle mode are disclosed in the First and second idle receiver mode methods disclosed in FIGS. 3 and 4, respectively, other methods which are within the scope of the present invention for setting the protocol layer to an idle mode may be possible depending on the specific design and protocols used in implementing the soft modem.

It is also noted that, when the soft modem performs a retrain or a rate renegotiation procedure in steps 114 of FIG. 3 or in step 132 of FIG. 4, those modules of the receiver 60 required for performing a training sequence which are deactivated are reactivated.

It will be appreciated that, while the methods of FIGS. 3 and 4 which use the first and the second idle receiver modes, respectively, result in a substantially reduced CPU utilization without breaking down the logical connection between the local and the remote DCE's, in both methods the receiver 60 cannot receive data from the remote modem.

Figure 5A:
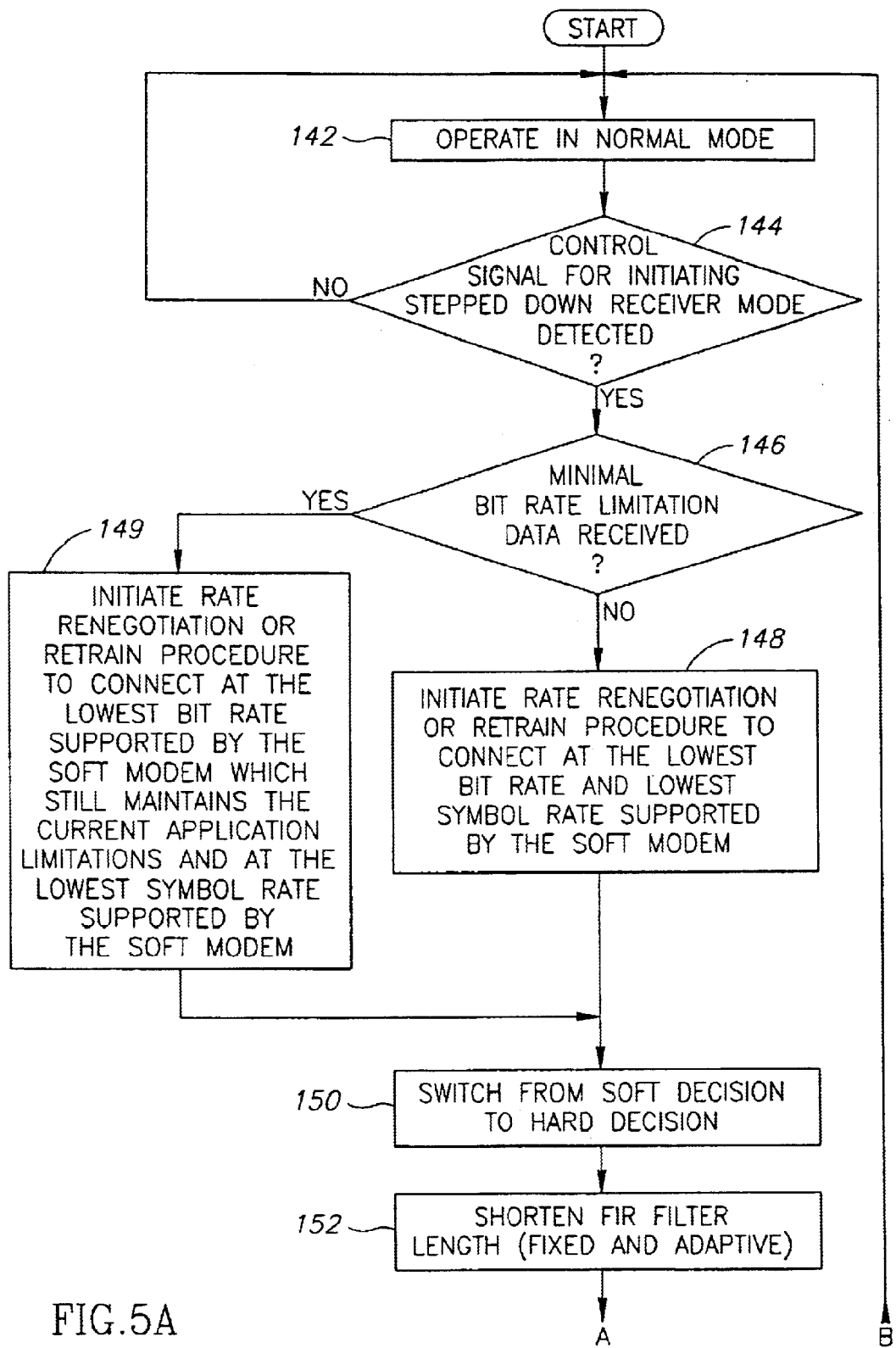
FIGS. 5A and 5B are schematic flow diagrams illustrating the steps of a third method for implementing a soft modem with a mode of reduced CPU utilization in accordance with still another preferred embodiment of the present invention.
Figure 5B:
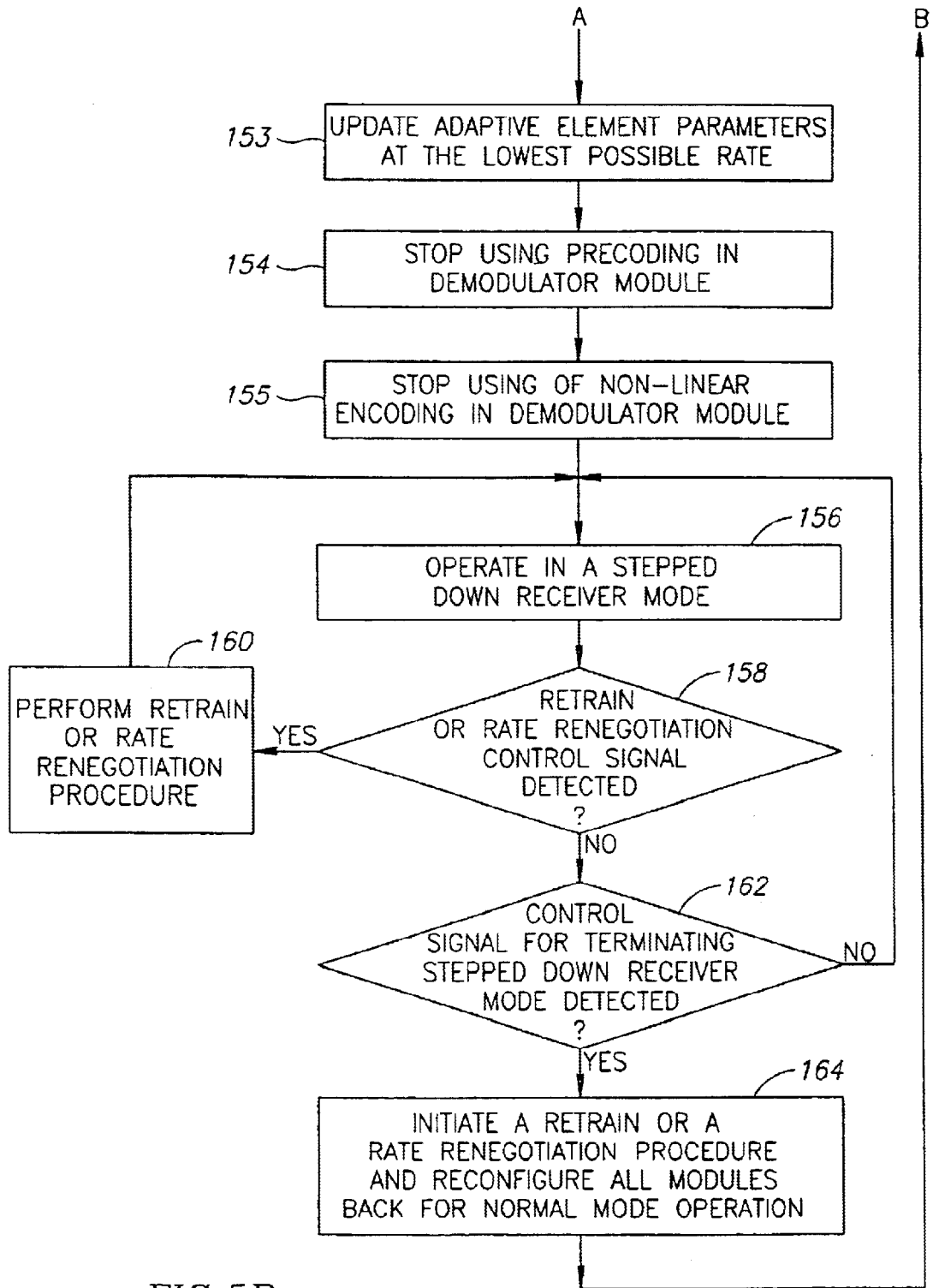

Reference is now made to FIGS. 5A and 5B which are schematic flow diagrams illustrating the steps of a third method for implementing a soft modem using another reduced CPU utilization mode which is referred to as the "stepped down receiver" mode hereinafter, in accordance with still another preferred embodiment of the present invention.

In contrast with the methods of FIGS. 3 and 4, in the stepped down receiver mode of FIGS. 5A and 5B, the receiver 60 is not deactivated but is operated in a way which reduces the CPU utilization while still leaving the receiver functioning.

The soft modem starts by operating in the normal mode hereinabove (step 142). The soft modem checks if a control signal for initiating the stepped down receiver mode is detected (step 144). If the soft modem receives a control signal for initiating the stepped down receiver mode, the soft modem checks whether data indicating the minimal bit rate limitation data for the current application/s using the soft modem for receiving and transmitting data was received (step 146). The bit rate limitation data is received by the controller module 12 of FIG. 1 from the current application using the soft modem. The rate limitation data can be transferred to the controller module 12 before the soft modem is activated or during the activation of the soft modem.

If data indicating the minimal bit rate limitation data for the current application was not received, the soft modem initiates a retrain or rate renegotiation procedure for connecting at the lowest bit rate and the lowest symbol rate supported by the soft modem (step 148).

If data indicating the minimal bit rate limitation data for the current application was received, the soft modem initiates a retrain or rate renegotiation procedure to connect at the lowest available bit rate supported by the soft modem which still maintains the current application limitations and at the lowest symbol rate supported by the soft modem (step 149).

The soft modem switches from soft decision to hard decision (step 150), shortens the FIR filter length of the adaptive and/or fixed filters (step 152), updates the adaptive element parameters at the lowest possible rate (step 153), stops using the special feature of preceding in the demodulator module 24 (step 154) and stops using the special feature of non-linear encoding in the demodulator module 24 (step 155). The soft modem then operates in the stepped down receiver mode (step 156).

It is noted that, while the embodiment of the soft modem of FIG. 5 includes steps 150–155 for reducing CPU utilization, all of these steps are optional. Thus, other implementations of the stepped-down receiver mode are possible including any combination of any number of steps selected from the group including steps 150–155 disclosed hereinabove. Many different embodiments of the present invention can be implemented each embodiment including one or more predetermined selected versions of the stepped down receiver mode which includes a specific combination of any number of steps selected from the group including steps 150–155. Each of these selected versions of the stepped-down receiver mode may have a different nominal CPU utilization value.

Additionally, in accordance with another preferred embodiment of the present invention (not shown), in addition to switching between the operational modes disclosed hereinabove, the soft modem can also switch between part or all of the different versions possible within the stepped-down receiver mode as disclosed hereinabove. This has the advantage of allowing a more graded "fine tuning" of the nominal of CPU utilization level. It will be appreciated by those skilled in the art that, while requiring the use of a larger number of different control signals, this preferred embodiment adds additional flexibility to the operation of the soft modem.

For example, in another embodiment of the present invention, steps 150–155 of FIG. 5 may be omitted. In another non limiting example the soft modem may include steps 150 and 153 while steps 152, 154 and 155 are omitted.

In another non-limiting example, the soft modem operates by switching between the normal mode, the first idle receiver mode, the second idle receiver mode and the stepped-down receiver mode and additionally can switch between a plurality of different versions of the stepped-down receiver mode in response to appropriate control signals.

It will be appreciated by those skilled in the art that soft modems implemented according to different standards may implement only some of the steps 150–155 since not all the features modified in the steps 150–155 are implemented in various standards. For example, a soft modem implemented according to the upcoming V.PCM standard does not use pre-coding in the downstream direction. Therefore the step 154 of FIG. 5 cannot be implemented in such a soft modem.

It is noted that, generally, the soft modem can directly switch from any of the possible versions of the stepped-down receiver mode to the first idle receiver mode or to the second idle receiver mode as disclosed hereinabove. However, switching from the first idle receiver mode or the second idle receiver mode to any of the possible versions of the stepped-down receiver mode requires switching back to the normal mode and subsequent switching to the desired version of the stepped-down mode as disclosed hereinabove.

It is further noted that, step 152 disclosed hereinabove can include shortening the adaptive and/or fixed FIR filters such as equalizers, input and channel filters and echo cancellers. If the soft modem includes only adaptive filters, step 152 shortens the adaptive FIR filters.

While operating in the stepped down receiver mode, the soft modem checks if a retrain or rate renegotiation control signal is received (step 158). If a retrain control signal or a rate renegotiation control signal is detected, the soft modem performs a retrain procedure or rate renegotiation procedure, respectively (step 160), and transfers control to step 156. If a retrain or a rate renegotiation control signal is not detected, the soft modem checks if a control signal for terminating the stepped down receiver mode is detected (step 162). If a control signal for terminating the stepped down receiver mode is not detected, the soft modem returns control to step 156. If a control signal for terminating the stepped down receiver mode is detected, the soft modem initiates a retrain or a rate renegotiation procedure (step 164) and reconfigures all the receiver modules for normal mode operation and returns control to step 142 for operating the soft modem in the normal mode norm.

It is noted that, while each of the preferred embodiments of FIGS. 3, 4, and 5 can switch between the normal mode and another mode having low CPU utilization, other preferred embodiments, which are within the scope of the present invention, can be implemented, in which the soft modem can switch between the normal mode any one of a plurality of modes selected from the group including the first idle receiver mode, the second idle receiver mode and the various CPU utilization levels of stepped down receiver mode (not shown).

Thus, the preferred embodiment having a plurality of selectable modes has the advantage of being flexible by enabling the soft modem to dynamically adapt for a variety of tasks having different and/or time varying CPU utilization requirements including tasks which do or do not require the operation of the receiver of the soft modem. For example, when the soft modem is used to download a graphic image data file, the soft modem is switched to the normal mode for maximal throughput. After the file is downloaded, the modem is switched to the first idle receiver mode to reduce CPU utilization enabling another task to work, the soft modem is then switched to the stepped down receiver mode for receiving information at a low rate.

Figure 6A:
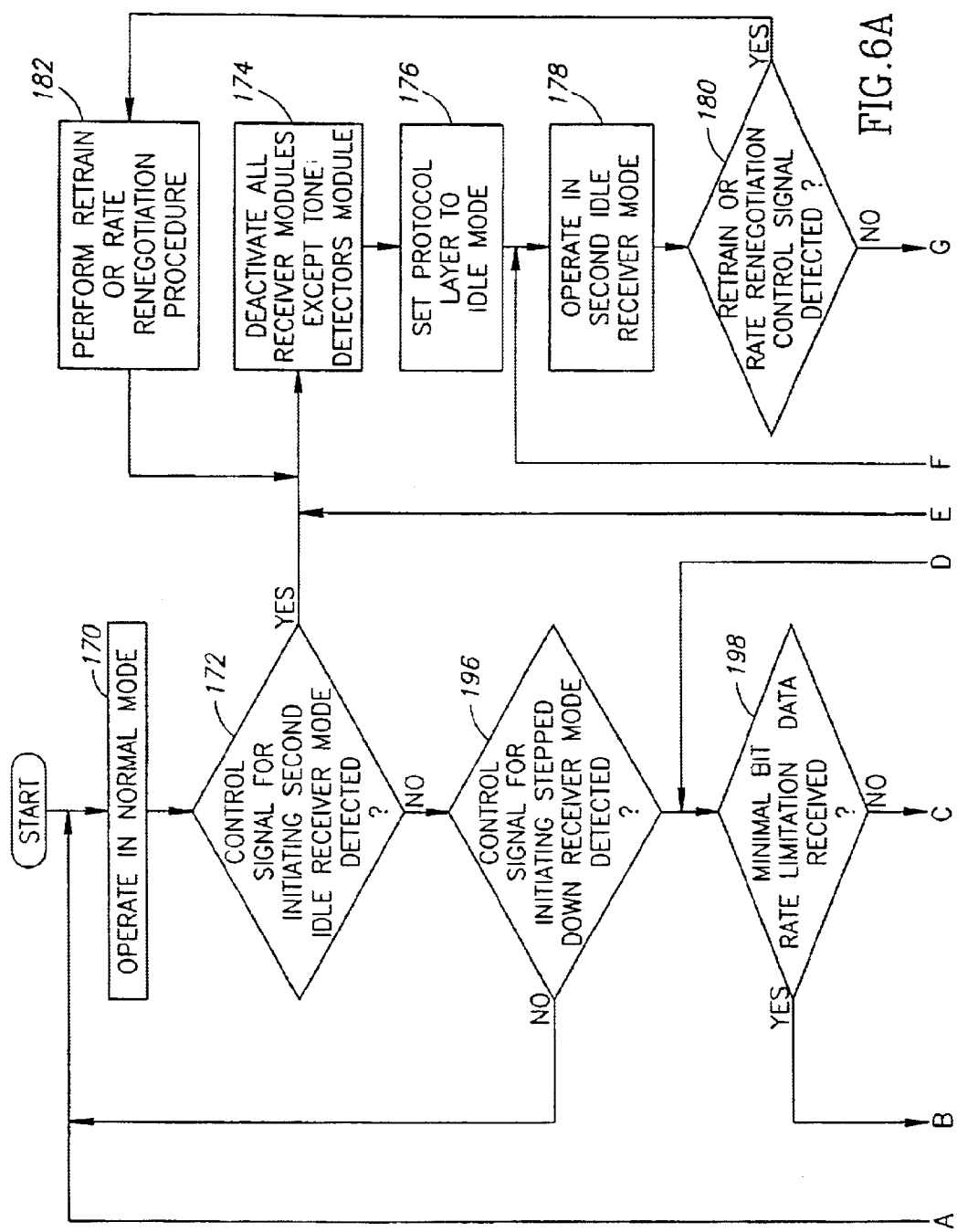
FIGS. 6A–6B are a schematic flow diagram illustrating the control flow in a soft modem having three operational modes, in accordance with another preferred embodiment of the present invention
Figure 6B:
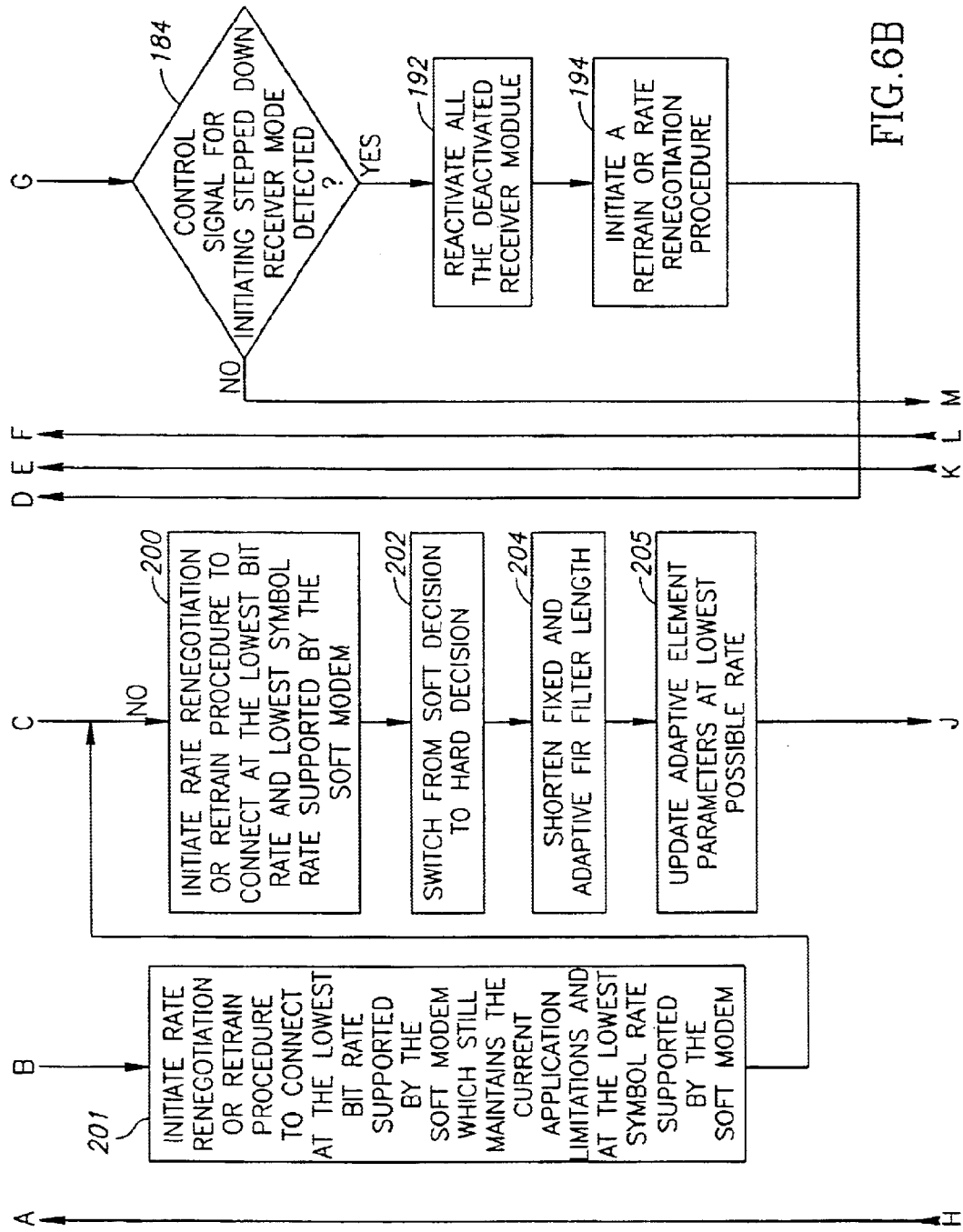
Figure 6C:
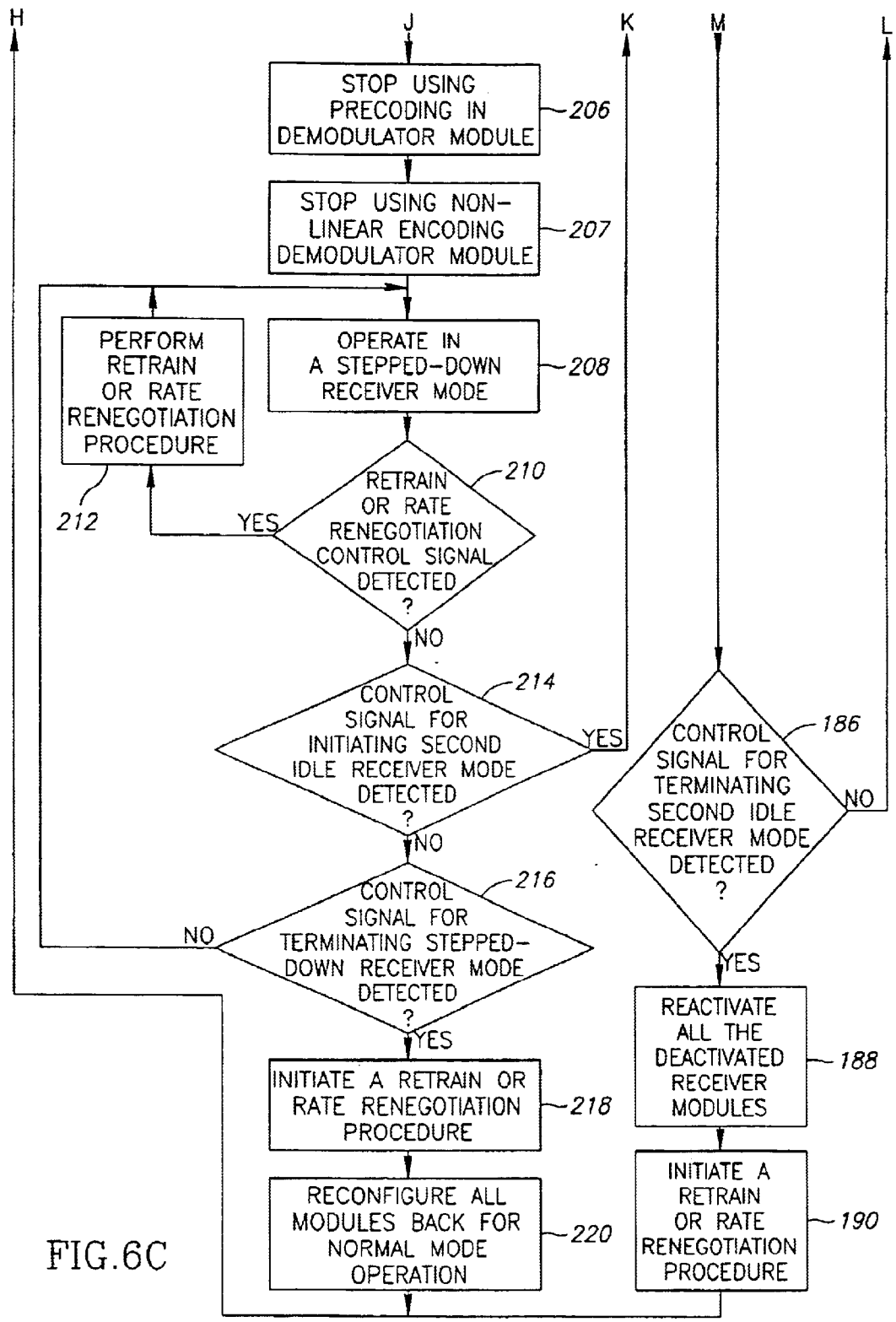

Reference is now made to FIG. 6 which is a schematic flow diagram illustrating the control flow in a soft modem having a normal mode having a nominally high CPU utilization and two additional modes having reduced CPU utilization, in accordance with another preferred embodiment of the present invention.

The soft modem starts by operating in the normal mode disclosed hereinabove (step 170). The soft modem checks if a control signal for initiating the second idle receiver mode is detected (step 172). If the soft modem receives a control signal for initiating the second idle receiver mode, the soft modem deactivates all the receiver modules except for the tone detectors module (step 174), and sets the protocol layer to the idle mode (step 176) as disclosed in detail for the first idle receiver mode hereinabove.

After the soft modem sets the protocol layer to the idle mode, the soft modem operates in the second idle receiver mode (step 178). While operating in the second idle receiver mode, the soft modem checks whether a retrain or rate renegotiation control signal is detected (step 180). If a retrain control signal or a rate renegotiation control signal is detected, the soft modem performs a retrain procedure or rate renegotiation procedure, respectively (step 182), and transfers control to step 174. If a retrain or a rate renegotiation control signal is not detected, the soft modem checks whether a control signal for initiating the stepped-down receiver mode is detected (step 184). If a control signal for initiating the stepped-down receiver mode is not detected, the soft modem checks whether a control signal for terminating the second idle receiver mode is detected (step 186). If a control signal for terminating the second idle receiver mode is not detected, the soft modem returns control to step 174. If a control signal for terminating the second idle receiver mode is detected, the soft modem reactivates all the deactivated receiver modules (step 188), initiates a retrain or rate renegotiation procedure (step 190) and returns control to step 170 resuming operation in normal mode.

Returning to step 184, if a control signal for initiating the stepped-down receiver mode is detected, the soft modem reactivates all the deactivated receiver modules (step 192), initiates a retrain or a rate renegotiation procedure (step 194) and transfers control to step 198.

Returning to step 172, if a control signal for initiating the second idle receiver mode is not detected, the soft modem checks whether a control signal for initiating the stepped-down receiver mode is detected (step 196). If a control signal for initiating the stepped-down receiver mode is not detected, the soft modem returns control to step 170. If a control signal for initiating the stepped-down receiver mode is detected, the soft modem checks whether data indicating the minimal bit rate limitation data for the current application was received (step 108).

If data indicating the minimal bit rate limitation data for the current application was not received, the soft modem initiates a retrain or rate renegotiation procedure for connecting at the lowest bit rate and the lowest symbol rate supported by the soft modem (step 200).

If data indicating the minimal bit rate limitation data for the current application was received, the soft modem initiates a retrain or rate renegotiation procedure to connect at the lowest available bit rate supported by the soft modem which still maintains the current application limitations and at the lowest symbol rate supported by the soft modem (step 201).

The soft modem switches from soft decision to hard decision (step 202), shortens the length of the fixed and the adaptive FIR filters (step 204), switches to updating the adaptive element parameters at the lowest possible rate (step 205), stops using preceding in the modulator and demodulator modules (step 206), stops using non-linear encoding in the modulator and demodulator modules (step 207) and proceeds to operate in the stepped-down receiver mode (step 208).

The soft modem checks whether a retrain or a rate renegotiation control signal is detected (step 210). If a retrain or a rate renegotiation control signal is detected, the soft modem performs a retrain or a rate renegotiation procedure, respectively, (step 212) and transfers control to step 208. If a retrain or a rate renegotiation control signal is not detected, the soft modem checks whether a control signal for initiating a second idle receiver mode is detected (step 214). If a control signal for initiating a second idle receiver mode is detected, the soft modem returns control to step 178. If a control signal for initiating a second idle receiver mode is not detected, the soft modem checks whether a control signal for terminating the stepped-down receiver mode is detected (step 216). If a control signal for terminating the stepped-down receiver mode is not detected, the soft modem returns control to step 208. If a control signal for terminating the stepped-down receiver mode is detected, the soft modem initiates a retrain or rate renegotiation procedure (step 218), reconfigures all modules back for normal mode operation (step 220) and transfers control to step 170 for normal operation.

It is noted that, while the embodiment illustrated in FIGS. 6A and 6B discloses a soft modem that can switch between the normal operation mode, the second idle receiver mode and the stepped-down receiver mode, other embodiments are possible in which the soft modem can switch between the normal mode and any combination of any number of modes selected from the three low CPU utilization modes disclosed hereinabove. For example, in accordance with another embodiment of the present invention, the soft modem can reversibly switch between the normal mode, the first idle receiver mode, the second idle receiver mode and the stepped-down receiver mode. In another example, in accordance with another embodiment of the present invention, the soft modem can reversibly switch between the normal mode, the first idle receiver mode, and the stepped-down receiver mode. The construction of any of these embodiments of the soft modem is within the scope of the present invention.

It is noted that, similarly to the embodiment illustrated in FIG. 4, steps 202–207 of FIG. 6 are optional steps. Additionally, the availability of the steps 202–207 depends on the specific standard implemented as disclosed in detail hereinabove.

It is also noted that, all the different embodiments of the soft modem are implemented using full-duplex operation.

It is further noted that, the data pump of FIG. 2 may implement the tone generators module 48 or the tone detector module 52 by using of other transmitter modules. For example, a tone generators module 48 may be implemented by insertion of a predetermined symbol instead of information symbols by the bits to symbols converter module 40, resulting in the transmission of a tone at the carrier frequency. Similarly, the tone detectors module 52 may be implemented by having the symbol to bit converter module 32 search for a predetermined symbol which is equivalent to searching a tone at the carrier frequency.

Figure 7:
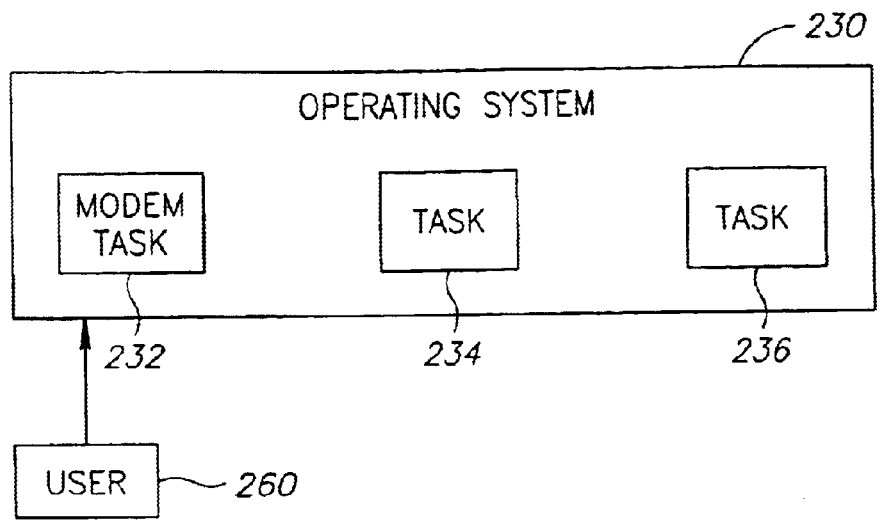
FIG. 7 is a schematic block diagram illustrating a method of controlling the soft modem, in accordance with a preferred embodiment of the present invention.

Reference is now made to FIG. 7 which is schematic block diagram illustrating a method of controlling the soft modem, in accordance with a preferred embodiment of the present invention. FIG. 7 illustrates a multi-tasking operating system 230. Several tasks are concurrently executed by the operating system 230 including a soft modem task 232 having controlled different CPU utilization modes as disclosed hereinabove, a task 234 and a task 236. The operating system 230 periodically checks the percentage of CPU cycles required by the currently executed tasks 232, 234 and 236. If the operating system detects that one or more of the tasks 234 and 236 require a higher percentage of CPU cycles than currently available, the operating system may send a control signal (not shown) to the soft modem task 232 switching it from the normal mode into one of the other operational modes having a lower CPU utilization level as disclosed hereinabove. The operating system can also switch the soft modem task 232 from any of the operational modes available to the soft modem 232 to any other one of these available operational modes depending on the level of available CPU cycles. Additionally, the operating system 230 may also allow external control of the soft modem task 232 by a user 260. For example, the user 260 may control the soft modem task by an AT command.

Figure 8:
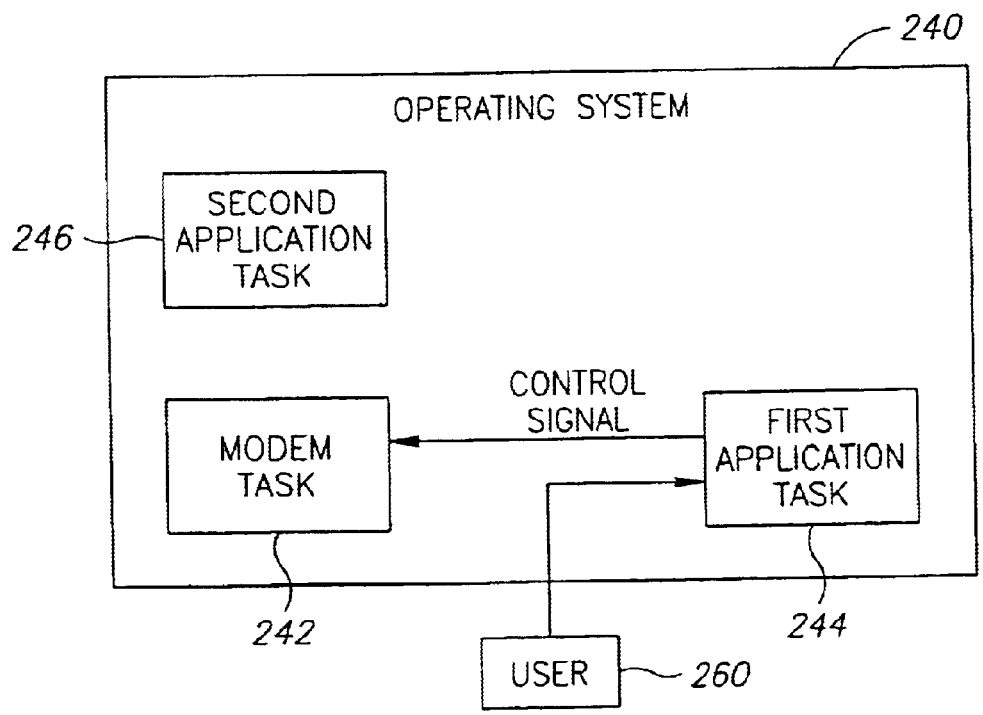
FIG. 8 is a schematic block diagram illustrating another method of controlling the soft modem, in accordance with another preferred embodiment of the present invention.

Reference is now made to FIG. 8 which is schematic block diagram illustrating another method of controlling the soft modem, in accordance with another preferred embodiment of the present invention in which applications run as tasks by the operating system can control a soft modem. FIG. 8 illustrates a multi-tasking operating system 240. Several tasks are concurrently executed by the operating system 240 including a soft modem task 242 having controlled different CPU utilization modes as disclosed hereinabove, a first application task 244 and a second application task 246.

In a non-limiting example, the first application task 244 can control the soft modem task 242 by sending control signals thereto. For example if the first application task 244 anticipates that it will not need to use the soft modem task 242 for communicating information at a high rate in the near future, the first application task 244 will initiate switching the soft modem task 242 from the normal mode to one of the other different operational modes available to the soft modem 242 which have a nominal CPU utilization level, by sending the soft modem 242 an appropriate control signal as disclosed hereinabove. The first application task 244 thus causes more CPU cycles to become available to the second application task 246. The first application task 244 may also similarly initiate the switching to cause more CPU cycles to become available for its own use. The first application task 244 can also be externally controlled by the user 260, for example by the user typing predetermined commands on the keyboard (not shown) of the computer (not shown) running the operating system 240.

It is noted that, the operating system 240 may concurrently run more than three tasks depending inter alia on the CPU performance and on the operating system implementation and that one of concurrently running tasks can control the soft modem task 242. However, it is noted that, attempting to control the soft modem 242 by more than one task or application may be complicated by the fact that the applications do not have information about each other.

Figure 9:
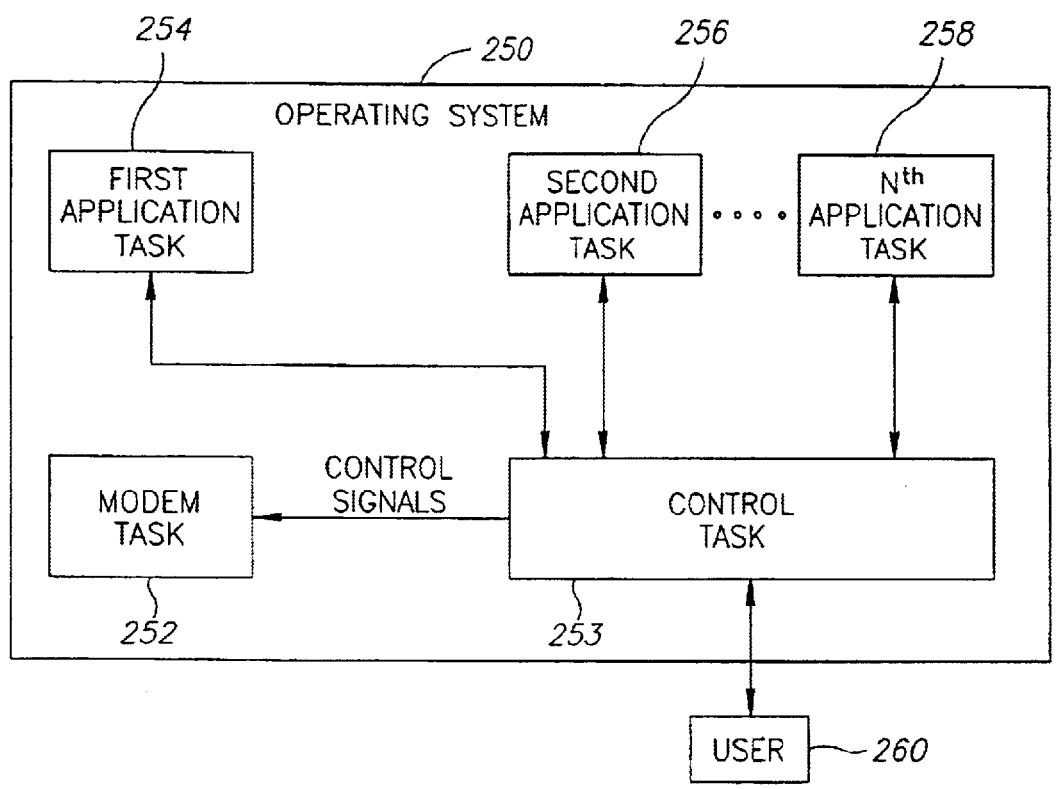
FIG. 9 is a schematic block diagram illustrating another method of controlling the soft modem, in accordance with still another preferred embodiment of the present invention.

Reference is now made to FIG. 9 which is schematic block diagram illustrating another method of controlling the soft modem, in accordance with still another preferred embodiment of the present invention.

The non-limiting example of FIG. 9 illustrates a multi-tasking operating system 250 shown as concurrently running a soft modem task 252 having controlled different CPU utilization modes as disclosed hereinabove, a plurality of N application tasks labeled 254, 256 and 258 and a control task 253. The control task 253 controls and times the N application tasks 254, 256 to 258 and also controls the soft modem task using control signals as disclosed in detail hereinabove. The control task 253 also receives information from all N tasks 254, 256 and 258 about their current CPU utilization, processes the information to detect a need for changing the CPU utilization level of the soft modem 252, and initiates the appropriate control signals for switching the soft modem task 252 from the currently used operational mode to another operational mode available to the soft modem 252 as disclosed hereinabove. This preferred embodiment has the advantage that the CPU utilization requirements and communication requirements of all the currently active application tasks can be coordinated by the control task 253 which then controls the operational mode of the soft modem task 252.

The non-limiting example of FIG. 9 also includes a user 260 which can manually control the soft modem 252 through the control task 253. It is noted that in a non-limiting example, the user 260 can control the operational modes of the soft modem task 252 by typing a suitable command on a keyboard (not shown) of the computer (not shown) on which the operating system 250 runs as disclosed hereinabove.

It is further noted that, the control of the soft modem tasks 232, 242 and 252 of FIGS. 7, 8 and 9, respectively, by the user 260 is optional and may or may not be included depending on the specific requirements of the implementation.

While the invention has been described with respect to a limited number of embodiments, it will be appreciated that many variations, modifications and other applications of the invention may be made.

What is claimed is:

1. A method of changing the processing power consumption of a soft modem on a multi-task processor, comprising:
    establishing a modem connection between the soft modem and a remote modem;
    receiving an indication of the processing power needs of one or more tasks, other than the soft modem, on the processor; and
    changing an operation mode of the soft modem from a first mode which has a first processing power utilization level to a second mode which has a second processing power utilization level, different from the first, responsive to the received indication, without disconnecting the connection, by stopping the use of precoding or of non-linear encoding in a modulator of the soft modem, wherein the second operation mode comprises a mode in which at least one of the modules of a transmission path of the soft modem, but not all the modules, is not operational.

2. A method according to claim 1, wherein receiving an indication of the processing power needs of one or more tasks on the processor comprises receiving an indication on the processing power needs of one or more non-modem tasks.

3. A method according to claim 1, further comprising receiving an indication of the communication needs of one or more other tasks running on the processor and wherein changing the operation mode is performed responsive to a function of the indication on the processing and communication needs.

4. A method according to claim 1, wherein receiving an indication comprises receiving an indication from an operating system of the processor.

5. A method according to claim 1, wherein receiving an indication comprises receiving an indication that the one or more other tasks require a higher percentage of CPU cycles of the processor than currently available.

6. A method according to claim 1, wherein receiving an indication comprises receiving an indication from the one or more other tasks.

7. A method according to claim 1, wherein receiving an indication comprises receiving an indication of the processing power needs of a computer game.

8. A method according to claim 1, wherein changing the operation mode comprises changing the mode irrespective of contents of signals received by the soft modem.

9. A method according to claim 1, wherein receiving an indication of the processing power needs of one or more tasks on the processor comprises receiving indication on the processing power needs of a plurality of tasks.

10. A method according to claim 1, wherein changing the operation mode comprises moving, responsive to the received indication, a protocol layer above the soft modem from a state in which it receives information to an idle state in which the protocol layer does not receive information.

11. A method according to claim 1, wherein changing of the operation mode is performed without the remote modem being aware of the change.

12. A method according to claim 11, wherein changing of the operation mode is performed without changing a transmission rate of signals on the connection.

13. A method according to claim 1, wherein the first processing power utilization level is greater than the second processing power utilization level.

14. A method according to claim 1, wherein the change of the operation mode is made without a renegotiation.

15. A method according to claim 1, further comprising changing the operation to a third operation mode which has a third processing power utilization level different from the first and second processing power utilization levels.

16. A method according to claim 1, wherein the first operation mode comprises a mode in which substantially all the modules of the soft modem are operational.

17. A method according to claim 1, wherein during the first operation mode the soft modem performs soft signal decisions and during the second operation mode the soft modem performs hard signal decisions.

18. A method according to claim 1, wherein during the first operation mode the soft modem uses a longer filter length than during the second operation mode.

19. A method according to claim 1, wherein during the first operation mode the soft modem updates one or more adaptive element parameters at a higher rate than during the second operation mode.

20. A method according to claim 1, wherein in both the first and second operation modes the soft modem provides received data to an application layer.

21. A method according to claim 1, wherein changing the operation mode of the soft modem from the first mode to the second mode comprises storing one or more parameters of the operation of the soft modem.

22. A method according to claim 21, wherein storing one or more parameters comprises storing one or more equalizer coefficients or PLL coefficients.

23. A method according to claim 21, comprising utilizing the stored one or more parameters in changing the operation mode of the soft modem from the second mode to the first mode.

24. A method according to claim 1, wherein That least one of the modules of a reception path of the soft modem is not operational or operates in a reduced operation mode.

25. A method according to claim 21, wherein storing one or more parameters comprises storing one or more timing recovery locked loop parameters.

26. A method according to claim 1, wherein changing the operation mode of the soft modem comprises stopping the use of precoding in a modulator of the soft modem.

27. A method according to claim 1, wherein changing the operation mode of the soft modem comprises stopping the use of non-linear encoding in a modulator of the soft modem.

28. A method of changing the processing power consumption of a soft modem on a multi-task processor, comprising:

establishing a modem connection between the soft modem and a remote modem;

receiving an indication of the processing power needs of one or more tasks, other than the soft modem, on the processor; and changing an operation mode of the soft modem from a first mode which has a first processing power utilization level to a second mode which has a second processing power utilization level, different from the first, responsive to the received indication, without disconnecting the connection, by stopping the use of precoding or of non-linear encoding in a demodulator of the soft modem, wherein the second operation mode comprises a mode in which at least one of the modules of a reception path of the soft modem, but not all the modules, is not operational.

29. A method according to claim 28, wherein in both the first and second operation modes the soft modem provides received data to an application layer.

30. A method according to claim 28, wherein changing the operation mode of the soft modem comprises stopping the use of precoding in a demodulator of the soft modem.

31. A method according to claim 28, wherein changing the operation mode of the soft modem comprises stopping the use of non-linear encoding in a demodulator of the soft modem.

* * * * *